Patented Aug. 22, 1950

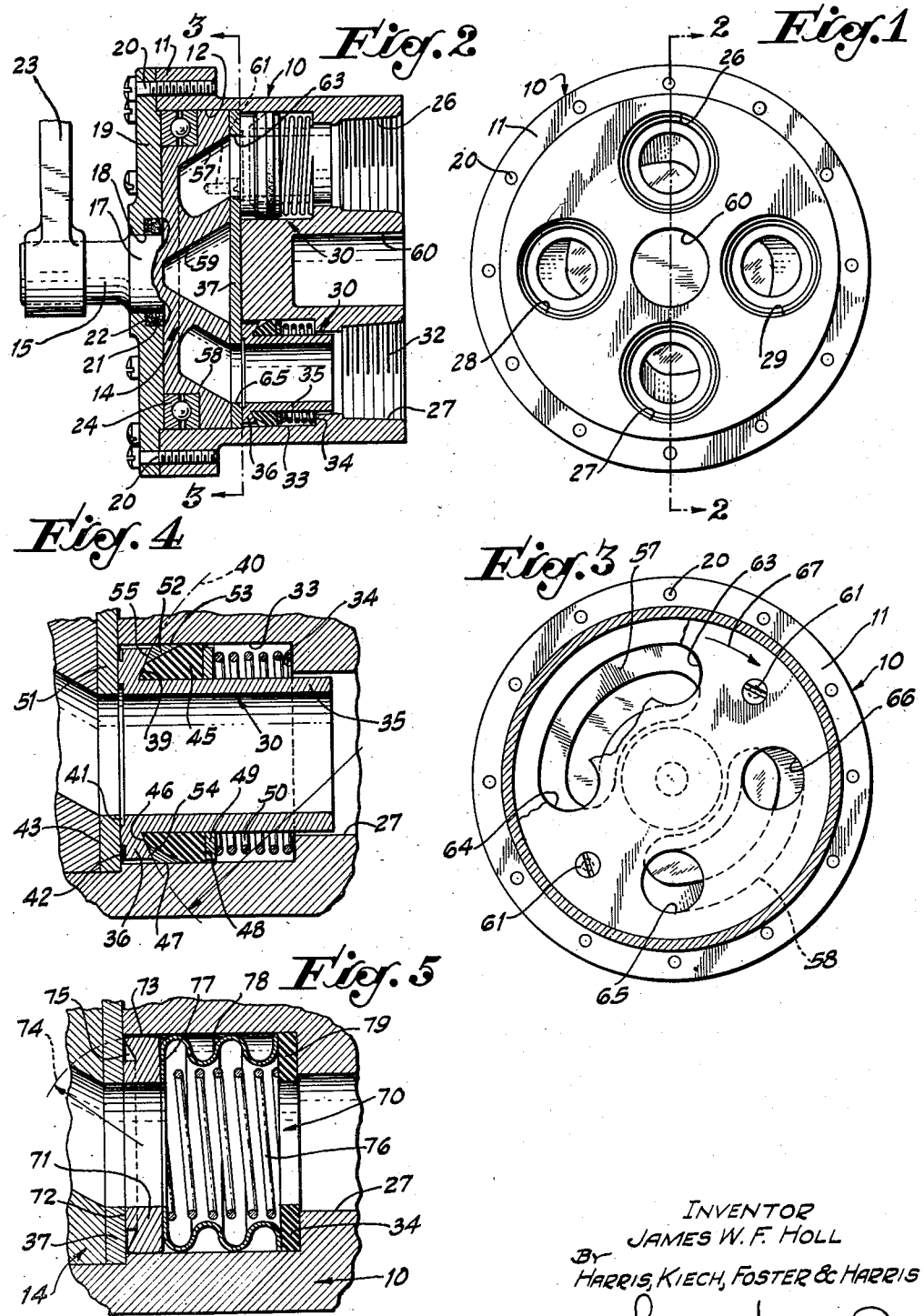

2,519,574

UNITED STATES PATENT OFFICE 2,519,574

ROTARY FLUID VALVE

James W. F. Holl, Long Beach, Calif.

Application February 28, 1944, Serial No. 524,216

8 Claims. (Cl. 251—87)

My invention relates to the fluid valve art and, more particularly, to a rotary valve of the ported plate type.

The invention has particular utility when used in high-pressure four-way valves and, consequently, will be described in connection with such use, but it is to be understood that the construction may also be utilized profitably in various types of low pressure valves, such as, for example, fuel valves, and that features of the invention may be successfully utilized in valves other than four-way valves. The specific embodiments shown and described herein are not, therefore, to be construed as limiting, and I desire to cover all constructions within the spirit of my invention.

Rotary valves of the ported plate type are generally old and well known in the art, having been used for many years, for example, to supply and control a flow of fuel gas to the conventional type of home gas water heater. Such valves are generally provided with a plurality of gas ports communicating with a rotatable control plate which is also suitably ported to direct the flow of gas between the gas ports as desired in response to rotation of the plate. Such prior valves have been developed to operate at the relatively low gas pressures normally provided by gas distribution systems, and are wholly unsuited for and incapable of use with high pressure fluid systems, such as, for example, those employed in aircraft hydraulic systems in which fluid operating pressures in excess of 1000 pounds per square inch are common. Obviously, the problem of providing adequate fluid seals for valves used in such high pressure aircraft systems is substantial, and, so far as I am aware, has not heretofore been solved in the art.

It is therefore a primary object of my invention to provide a rotary valve of the ported plate type which is adapted for operation in relatively high pressure fluid systems.

A further object of my invention is to provide such a valve as is generally referred to above in which the fluid flow passages throughout the valve are of sufficiently great cross-sectional area to prevent any substantial fluid pressure drop across the valve. The specific construction by which this object is accomplished is, so far as I am aware, novel in the art.

Another object of the invention is to provide a sealing means adapted to be used in such a rotary valve to provide a positive fluid-tight seal between two relatively moving surfaces. I prefer to accomplish this by providing a tubular sleeve adapted to engage the rotary ported plate and to be held in such engagement by hydraulic or spring pressure, or both, the manner of accomplishing this also being novel.

Still another object of the invention is to provide a sealing means adapted to be used in such a rotary valve to provide a positive fluid-tight seal between two relatively moving surfaces, including a tubular seal held in floating relationship against such surfaces.

It is another object of my invention to provide such a sealing means as is generally described above, in which means is provided for automatically bleeding off any excess and undesired pressure fluid that may accumulate behind the sealing means as a result of minor leakage between parts of the valve.

A further object of the invention is to provide such a sealing means which automatically compensates for wear, misalignment, and expansion of mating sealing surfaces. I prefer to utilize metal-to-metal for the primary sealing surfaces of my invention, although this is not essential under certain conditions of operation of use.

Another object of my invention is to provide such a valve which may be adapted for low pressure, as well as high pressure, fluid systems.

Still another object of the invention is to provide a valve of the rotary ported plate type which is economical to manufacture, simple to assemble, and in which replacement of parts is greatly expedited and facilitated. Consequently, the specific construction of the preferred embodiment disclosed has a number of design features that contribute materially to the success of my invention, as will become apparent hereinafter.

Other objects and advantages will appear from the specification and drawing, which are for the purpose of illustration only, and in which:

Fig. 1 is an end view of my valve device.

Fig. 2 is a cross-sectional view taken on the line 2—2 of Fig. 1.

Fig. 3 is a sectional view taken on the line 3—3 of Fig. 2, partly broken away to illustrate better the internal construction of the device.

Fig. 4 is an enlarged fragmentary sectional view of the preferred sealing means of the invention.

Fig. 5 is an enlarged fragmentary sectional view of an alternative form of sealing means of my invention.

Referring to the drawing, I show a housing 10 preferably, although not necessarily, circular in form, provided at one end with an annular flange 11 and an axial bore 12, the latter forming a valve chamber in the housing and providing a flat chamber wall 13 which is perpendicular to the longitudinal axis of the housing.

Disposed within the axial bore 12 is a rotatable plate member 14 having an actuating rod 15 connected thereto or formed integrally therewith and extending axially from the housing 10, the actuating rod 15 being provided with a hub 17 which is journalled in a bearing opening 18 centrally formed in a cover plate member 19 which, in turn, is suitably secured, as by machine screws 20, to the annular flange 11 of the housing 10. Annularly formed in the bearing opening 18 is a packing channel 21 in which suitable packing 22 is provided to engage the hub 17 and form a fluid seal therewith to prevent fluid leakage between the bearing opening and the hub. Provided on the outer end of the actuating rod 15, and rigidly secured thereto, is an operating handle 23 by which the actuating rod and the rotatable plate member 14 may be rotated. Disposed between the cover plate member 19 and the rotatable plate member 14 in the axial bore 12 is a thrust bearing 24, of conventional form, which, together with the bearing opening 18, forms means for rotatably supporting the plate member in the housing.

As best shown in Figs. 1 and 2, the housing 10 is provided with a first port 26, a second port 27, a third port 28, and a fourth port 29, the ports being preferably equidistantly circumferentially spaced and having their axes parallel to the axis of the housisg 10. As will be understood by those skilled in the art, more or less of such ports may be provided and they may be differently spaced, without departing from the spirit of my invention. Since the ports 26, 27, 28, and 29 are all identical in construction, only one thereof will be described in detail, and since each of the ports contains a sealing means 30, all of which are of identical construction, only one of such sealing means will be described in detail.

The port 27 is provided at its outer end with threads 32 adapted to threadedly receive suitable piping (not shown), the inner end of the port being counterbored to provide a cylindrical bore 33 of enlarged diameter and forming an annular shoulder 34. This construction is best illustrated in Fig. 4, which is also referred to for the specific construction of the sealing means 30.

The sealing means 30 includes a tubular sleeve 35 provided on its inner end with an annular shoulder 36, the annular shoulder 36 being of smaller external diameter than the cylindrical bore 33 of the port 27 and being adapted to engage a facing plate 37 to be described hereinafter. The outer end face 39 of the annular shoulder 36 is undercut on a radius indicated by the dotted line 40. The annular shoulder 36 is provided with an inner annular groove 41 and an outer annular groove 42 to form an engaging face 43 therebetween which engages the facing plate 37. I have found it desirable to make the engaging face 43 of relatively small cross-sectional area so as to reduce friction between the engaging face and the facing plate 37, and I have further found that by reducing the area of engagement of the engaging face 43 more perfect sealing is provided against the facing plate 37, the engaging face tending to wear quickly to form a subtantially perfect fluid seal against the facing plate. This action is particularly true when both the shoulder 36 and the facing plate 37 are formed of metal, as I intend them to be in the preferred form of the invention. The inner annular groove 41 has a further function in that it permits fluid from the interior of the tubular sleeve 35 to exert a longitudinal pressure outwardly against the inner end of the sleeve to at least partially balance the fluid pressure exerted by such fluid on the opposite end of the sleeve, which reduces the tendency of the sleeve to lock against the facing plate 37 in response to hydraulic pressure bearing on the outer end of the sleeve. The external diameter of the inner annular groove 41 may, of course, be varied as desired and must be correlated with the maximum fluid pressure admitted to the sleeve 35 and the cross-sectional area of the outer end of the sleeve. The outer annular groove 42 also has an additional function in increasing the available end area of the shoulder 36 radially outward from the engaging face 43 so that in the event pressure fluid leaks into the annular space between the shoulder and the cylindrical bore 33, this pressure fluid will exert a hydraulic thrust against the inner end of the shoulder and consequently the tubular sleeve 35 so that in the event the pressure thereof builds up to a sufficiently large figure relative to the fluid pressure within the tubular sleeve 35, it will exert an outward thrust on the tubular sleeve tending to force it out of engagement with the facing plate 37 to permit this excess pressure on its exterior to bleed off directly into the interior of the tubular sleeve and thus be released from the device.

Disposed on and encircling the tubular sleeve 35 is an annular packing element 45, preferably formed of Neoprene or other resilient material. The packing element 45 is provided with an inner convex end face 46, formed to substantially the radius indicated by the dotted line 40, and which engages and mates with the undercut end face 39 of the shoulder 36. The packing element 45 is also provided with a bevelled evternal face 47 and with an outer vertical end face 48 against which engages a follower washer 49, which in turn is engaged by a compression spring 50, the other end of which engages the annular shoulder 34. When assembled as shown in Fig. 4, the compression spring 50 exerts a longitudinal thrust against the washer 49 and in turn against the sleeve 35 through the packing element 45 and the shoulder 36 to tend to maintain the engaging face 43 in pressure engagement with the facing plate 37 so as to provide a fluid seal therebetween. As will be noted, the external diameter of the tubular sleeve 35 is somewhat less than the diameter of the port 27, and consequently fluid can readily flow therebetween into the cylindrical bore 33 to exert a fluid pressure against the washer 49 as well as against the outer end of the tubular sleeve 35 which, because the area thereof is greater than the area on the inner end of the sleeve 35 to which such fluid pressure is admitted, provides a differential area piston arrangement by which the fluid pressure also tends to exert a thrust leftward, as seen in Fig. 4, against the tubular sleeve 35 to maintain the engaging face 43 in pressure engagement with the facing plate 37. Thus, while the compression spring 50 may not be absolutely essential in some installations and may be dispensed with if desired, I prefer to include it so as to provide a positive mechanical means for holding the engaging face 43 in sealing engagement with the facing plate 37 to insure reengagement in the event that fluid pressure in the outer annular groove 42 forces the tubular sleeve 35 to the right, as seen in Fig. 4, to enable excess pressure in the outer annular groove to bleed back into the interior of the tubular sleeve.

Provided between the end face 39 of the annular shoulder 36 and the bevelled external face 47 of the packing element 45 is a wedge ring 52 of generally triangular shape, having an outer cylindrical surface 53 in sliding engagement with the cylindrical bore 33, an inner bevelled face 54 engaging the bevelled external face 47 of the packing element 45, and having an end face 55 formed on the radius indicated by the dotted line 40 and which mates with the outer portion of the undercut end face 39 of the shoulder 36. The specific form of the wedge ring 52 is an important feature of the invention, as it prevents the packing element 45 and the material thereof from creeping or extruding into the space between the periphery of the annular shoulder 36 and the cylindrical bore 33. The wedge ring 52 is preferably formed of metal, such as, for example, brass or bronze, although any suitable material may be used.

Due to the fact that the end face 39 of the annular shoulder 36 is undercut on the radius indicated by the dotted line 40 and the end faces 46 and 55 of the packing element 45 and the wedge ring 52, respectively, mate therewith, it forms what is, in effect, a ball and socket joint between the tubular sleeve 35 and the packing element 45 and wedge ring 52, thus permitting slight oscillatory movement therebetween to permit the engaging face 43 of the tubular sleeve 35 to properly align itself in fluid-tight engagement with the facing plate 37. The tubular sleeve 35 may thus be regarded as being retained in floating relationship relative to the facing plate 37 to permit automatic self-alignment therebetween and to compensate for wear therebetween.

As best shown in Figs. 2 and 3, the rotatable plate member 14 is providd with a first arcuate passage 57 and a second arcuate passage 58, which, as will be noted, are of relatively large cross-sectional area so as to permit a free and uninterrupted flow of fluid therethrough and thus prevent any substantial pressure drop therethrough. Both the plate member 14 and the housing 10 may be centrally cored out to form chambers 59 and 60, respectively, to lighten the weight of the unit, although these chambers, or either of them, may be omitted if desired, as they have no mechanical function in the valve. Secured to the inner face of the plate member 14, as by suitable screws 61, is the facing plate 37. The facing plate 37 is provided with apertures 63, 64, 65, and 66, which are, in the embodiment shown, spaced therein similarly to the spacing of the ports 26, 27, 28, and 29, the apertures 63 and 64 communicating with the first arcuate passage 57 of the plate member 14, and the apertures 65 and 66 communicating with the second arcuate passage 58 of the plate member.

As will be understood by those skilled in the art, the construction shown is simple to manufacture and easy to assemble or disassemble. Removal of the machine screws 20 permits the cover plate member 19, the thrust bearing 24, and the rotatable plate member 14 with the facing plate 37 attached thereto to be withdrawn from the housing 10 as a unit, following which each of the sealing means 30 may be readily removed from the housing 10 through the axial bore 12 of the housing. Consequently, any of the parts of the device may be easily removed for replacement or repair, and upon assembly or reassembly each of the sealing means 30 will automatically align itself properly with the facing plate 37 so that such assembly or reassembly may be carried out by an unskilled operator.

In operation, as will be understood by those skilled in the art, the first port 26 may be connected by suitable tubing (not shown) to a source of fluid under pressure, the second port 27 may similarly be connected to a point of disposal, and the ports 28 and 29 may be similarly connected to points of usage of the fluid, in which case the port 26 may be termed an inlet port, the port 27 an outlet port, and the ports 28 and 29 may be termed supply ports. Such fluid connections are standard practice in aircraft where a four-way valve is utilized to alternatively direct flow from a source of high pressure fluid to either end of an actuating cylinder having a piston therein, in which when the inlet is in communication with one end of the cylinder the outlet is in communication with the other, and vice versa. Valves for this purpose in aircraft operation are commonly referred to as "selector valves," and my valve device described herein may be used in such a manner. When so used, as will be understood, when the parts of my valve device are in the positions illustrated in the drawing, the port 26 communicates through the aperture 63 and the first arcuate passage 57 and the aperture 64 with the port 28, and the port 27 communicates through the aperture 65 and the second arcuate passage 58 and the aperture 66 with the port 29. By rotating the plate member 14 ninety degrees clockwise, as illustrated by the arrow 67 in Fig. 3, fluid communication is opened from the port 26 through the aperture 64 and the first arcuate passage 57 and the aperture 63 with the port 29, and simultaneously fluid communication is provided between the port 27 and the port 28 through the aperture 66 and the second arcuate passage 58 and the aperture 65. Thus, in the embodiment disclosed, there are two operating positions of the valve, but it is to be noted that the plate member 14 may be rotated to an intermediate position in which the apertures 63, 64, 65, and 66 are out of alignment with the ports 26, 27, 28, and 29 so that no fluid may flow through the arcuate passages 57 and 58, and this intermediate position may be termed a neutral position.

An alternative form of sealing means 70 is illustrated in Fig. 5, which may be substituted for the sealing means 30 in the preferred embodiment if the valve device is desired to be used to control a flow of fluid at low pressures. It is to be noted that the sealing means 70 is directly interchangeable with the sealing means 30, which is a feature of the invention adapting it to either high or low pressure use as desired, although it is to be understood that the preferred embodiment illustrated in Figs. 1 to 4, inclusive, may also be used to control the flow of fluid at low pressures without change if desired. The sealing means 70 includes a sealing ring 71 similar in purpose to the tubular sleeve 35 of the embodiment previously described, the sealing ring 71 being provided with an engaging face 72 similar to the engaging face 43 in general purpose and which is adapted to engage the facing plate 37 of the plate member 14. The sealing ring 71 is provided with a peripheral convex face 73 formed on a radius indicated by the dotted line 74, which permits the sealing ring to automatically align itself with the facing plate 37 in assembly or due to wear between these parts. The sealing ring 71 is provided with an undercut groove 75 in its inner face, which is provided for the same general purpose as the outer annular groove 42 illustrated in Fig. 4. The sealing ring 11 is provided with an outer face 77 to which is suitably secured one end of a bellows 78, which may be formed of metal or resilient material, such as, for example, rubber or Neoprene, the other end of the bellows being secured to a washer ring 79 preferably formed of Neoprene or rubber and which in turn engages the shoulder 34 of the housing 10. As will be understood, in this form of sealing means fluid pressure in the port 27 is, in effect, admitted to substantially the entire outer face 77 of the sealing ring 71 by the bellows 78, and since the cross-sectional area of the outer face 77 is substantially greater than the cross-sectional area of the engaging face 72, the fluid pressure exerts a longitudinal thrust on the sealing ring tending to retain it in sealing engagement with the facing plate 37. A compression spring 76, similar in function to the compression spring 50, is provided in this embodiment, although, if desired, the spring 76 may be omitted in some installations.

Although I have shown and described preferred embodiments of my invention, it is to be understood that departure may be made from the specific disclosure without departing from the spirit of my invention, and accordingly I do not intend to be limited thereby, but desire to be afforded the full protection of the following claims.

I claim as my invention:

1. In a valve device, the combination of: a housing having a first port provided with a cylindrical bore, and said housing having a second port; a rotatable plate member in said housing having a fluid passage formed therein, said plate member being rotatable to a first position in which said passage communicates with said first port but is out of communication with said second port, or to a second position in which said passage communicates with both ports and provides fluid communication therebetween, said plate member having a face normal to the axis of said cylindrical bore; a tubular sealing means disposed in said cylindrical bore and axially movable therein, said sealing means including a sleeve adapted to engage said plate member, and an annular packing element surrounding said sleeve and adapted to engage said cylindrical bore to provide a fluid seal between said sleeve and said bore, the periphery of said packing element at its end toward said plate member being bevelled, and having an annular wedge ring adapted to fit between said bevelled portion of said packing element and said wall to confine said packing element; means for rotatably supporting said plate member in said housing; and means for rotating said plate member in said housing selectively to either of said positions.

2. In a valve device, the combination of: a housing having a chamber therein adjacent one end thereof and a bore communicating with said chamber to provide a first port, said bore having a major portion adjacent said chamber of relatively large diameter and having a minor portion remote from said chamber of relatively small diameter and providing an annular shoulder between said portions, said housing having a second port communicating with said chamber; a rotatable plate member in said chamber having a fluid passage formed therein, said plate member being rotatable on an axis parallel to said bore to a first position in which said passage connects said ports and to a second position in which said fluid passage is out of registry with at least one of said ports; means for rotating said plate member; a tubular sealing member disposed in said bore, said sealing member having a radially extending annular flange portion on the inner end thereof extending into said major portion of said bore and relieved on its inner and outer sides at the inner end thereof to provide a sealing area for engagement with said plate member of substantially less area than the maximum cross-sectional area of said flange, the outer end of said tubular sealing member providing substantial clearance with said bore to permit fluid under pressure to pass freely from said minor portion into said major portion around said sealing member, said sealing member being provided with annular resilient sealing means on the periphery thereof adapted to form a fluid seal between said member and said major portion of said bore, said sealing member being provided with means engageable between said shoulder and said sealing member to urge resiliently said sealing member towards said plate member, said tubular sealing member being oscillatable and longitudinally movable relative to said bore; and thrust bearing means between said plate member and said housing and permitting rotary movement of said plate member but preventing longitudinal axial movement thereof.

3. In a valve device, the combination of: a housing having a chamber therein adjacent one end thereof and a bore communicating with said chamber to provide a first port, said bore having a major portion adjacent said chamber of relatively large diameter and having a minor portion remote from said chamber of relatively small diameter and providing an annular shoulder between said portions, said housing having a second port communicating with said chamber; a rotatable plate member in said chamber having a fluid passage formed therein, said plate member being rotatable on an axis parallel to said bore to a first position in which said passage connects said ports and to a second position in which said fluid passage is out of registry with at least one of said ports; means for rotating said plate member; sealing means in said bore and adapted to form a fluid-tight seal between said plate member and said bore, said sealing means including a tubular sleeve having an inner end adapted to engage said plate member, the inner and outer peripheries of said inner end of said sleeve being relieved to form a sealing area on said inner end of substantially less area than the maximum cross-sectional area of said sleeve, the outer end of said sleeve having an external diameter substantially smaller than the internal diameter of said bore so as to permit fluid under pressure to pass freely from said minor portion into said major portion around said sleeve and so as to permit said sleeve to be oscillated relative to said bore, said sleeve being provided with an annular resilient sealing means on the periphery thereof adapted to form a fluid-tight seal between said sleeve and said major portion of said bore, said sealing means being provided with resilient means acting between said sleeve and said shoulder to resiliently maintain said sleeve in engagement with said plate member; and thrust bearing means between said plate member and said housing and permitting rotary movement of said plate member but preventing longitudinal axial movement thereof.

4. In a valve device, the combination of: a housing having a chamber therein and a bore communicating with said chamber to provide a first port, said housing having a second port communicating with said chamber; a rotatable plate member in said chamber having a fluid passage formed therein, said plate member being rotatable on an axis parallel to said bore to a first position in which said passage connects said ports and to a second position in which said passage is out of registry with at least one of said ports; means for rotating said plate member; sealing means in said bore and adapted to form a fluid-tight seal at fluid pressures of in excess of 1000 pounds per square inch between said plate member and said bore, said sealing means including a tubular sleeve having an inner end adapted to engage said plate member, the inner and outer peripheries of said sleeve being undercut to form a sealing area on said inner end of substantially less area than the maximum cross-sectional area of said sleeve adjacent said plate member, the outer end of said sleeve having an external diameter substantially smaller than the internal diameter of said bore so as to permit fluid under pressure to pass freely in said bore to the periphery of said sleeve and so as to permit said sleeve to be moved an appreciable distance transversely relative to said bore, said sleeve being provided with an annular resilient sealing means on the periphery thereof and spaced longitudinally from said plate member and adapted to form a fluid-tight seal between said sleeve and said bore, said sealing means being provided with resilient means acting between said sleeve and said housing for resiliently maintaining said sealing area on said sleeve in engagement with said plate member; and thrust bearing means operatively connected to said plate member and permitting rotary movement of said plate member but preventing longitudinal axial movement thereof.

5. In a valve device, the combination of: a housing having a chamber therein and a bore communicating with said chamber to provide a first port, said housing having a second port communicating with said chamber; a rotatable plate member in said chamber having a fluid passage formed therein, said plate member being rotatable on an axis parallel to said bore to a first position in which said passage connects said ports and to a second position in which said passage is out of registry with at least one of said ports; means for rotating said plate member; sealing means in said bore, said sealing means including a tubular sleeve adapted to fit into said bore so as to be axially and oscillatably movable therein, said sleeve having an annular shoulder adjacent one end thereof, said one end being adapted to engage said plate member, one side of said shoulder being undercut on a radius, and including an annular packing element around said sleeve having one side thereof adapted to engage said undercut portion of said shoulder, said packing element being adapted also to engage said bore, and including means for holding said sleeve in pressure engagement with said plate member; and thrust bearing means operatively connected to said plate member and permitting rotary movement of said plate member but preventing longitudinal axial movement thereof.

6. In a valve device, the combination of: a housing having a chamber therein and a bore communicating with said chamber to provide a first port, said housing having a second port communicating with said chamber; a rotatable plate member in said chamber having a fluid passage formed therein, said plate member being rotatable on an axis parallel to said bore to a first position in which said passage connects said ports and to a second position in which said passage is out of registry with at least one of said ports; means for rotating said plate member; sealing means in said bore, said sealing means including a tubular sleeve adapted to fit into said bore so as to be axially and oscillatably moved therein, said sleeve having an outer annular shoulder adjacent one end thereof, said one end being adapted to engage said plate member, one side of said shoulder being undercut on a radius, said sealing means also having an annular, substantially triangular wedge ring one face of which engages said bore and a second face of which engages said undercut portion, and an annular packing element around said sleeve and engaging the third face of said wedge ring, and resilient means in engagement with said packing element and adapted to tend to urge said packing element, said ring, and said sleeve axially in said bore towards said plate member, axial movement of said packing element forcing said wedge ring into sealing engagement with said undercut portion and said bore; and thrust bearing means operatively connected to said plate member and permitting rotary movement of said plate member but preventing longitudinal axial movement thereof.

7. In a valve device, the combination of: a housing having a chamber therein and a bore communicating with said chamber to provide a first port, said housing having a second port communicating with said chamber; a rotatable plate member in said chamber having a fluid passage formed therein, said plate member being rotatable on an axis parallel to said bore to a first position in which said passage connects said ports and to a second position in which said passage is out of registry with at least one of said ports; means for rotating said plate member; sealing means in said bore, said sealing means including a tubular sleeve adapted to fit into said bore so as to be axially and oscillatably movable therein, said sleeve having an annular shoulder adjacent one end thereof and having a substantial annular clearance from said bore so as to permit oscillation of said sleeve relative to said bore, said one end being adapted to engage said plate member; an annular insert member adapted to engage the side of said shoulder remote from said one end of said sleeve and to provide a close fit with said bore, and including an annular packing element around said sleeve having one side thereof adapted to engage said insert member, said packing element being adapted also to engage said bore, and including means for holding said sleeve in pressure engagement with said plate member, said insert member preventing blow-out of said packing element past said insert member and through said clearance between said shoulder and said bore; and thrust bearing means operatively connected to said plate member and permitting rotary movement of said plate member but preventing longitudinal axial movement thereof.

8. In a valve device, the combination of: a housing having a chamber therein and a bore communicating with said chamber to provide a first port, said housing having a second port communicating with said chamber; a rotatable plate member in said chamber having a fluid passage formed therein, said plate member being rotatable on an axis parallel to said bore to a first position in which said passage connects said ports and to a second position in which said passage is out of registry with at least one of said ports; means for rotating said plate member; sealing means in said bore including tubular sleeve means, one end of said sleeve means being adapted to engage said plate member in sealing relation therewith and the other end of said sleeve means being annularly spaced from said bore so as to provide a substantial clearance therebetween, said sealing means including annular flange means on said one end of said sleeve means and extending radially therefrom, said flange means including a first portion adjacent said one end of said sleeve means and annularly spaced from said bore so as to provide a substantial annular space therebetween, said flange means also including a second portion between said first portion and the other end of said sleeve means and making a close fit with said bore, the length of the periphery of said second portion being small relative to the length of said sleeve means, said sealing means also including an annular resilient packing element around said sleeve means and adapted to engage said second portion and said bore to form a fluid-tight seal therewith, said close fit between said second portion and said bore preventing said packing element from blowing through said annular space in response to high fluid pressure on said packing element, said small length of said second portion and said clearance and said space permitting said sleeve member to oscillate relative to said bore; means for holding said sealing means in pressure engagement with said plate member; and thrust bearing means operatively connected to said plate member and permitting rotary movement of said plate member but preventing longitudinal axial movement thereof.

JAMES W. F. HOLL.

REFERENCES CITED

The following references are of record in the file of this patent:

UNITED STATES PATENTS

| Number | Name | Date |
|---|---|---|
| 809,458 | Paxson | Jan. 9, 1906 |
| 905,605 | Tarn | Dec. 1, 1908 |
| 1,046,781 | Hanford | Dec. 10, 1912 |
| 1,488,296 | Stevens | Mar. 25, 1924 |
| 1,489,857 | Stevens | Apr. 8, 1924 |
| 1,736,261 | Hallett | Nov. 19, 1929 |
| 1,818,703 | Forman | Aug. 11, 1931 |
| 1,961,386 | Payne | June 5, 1934 |
| 2,030,458 | McKellar | Feb. 11, 1936 |
| 2,126,020 | Leach | Aug. 9, 1938 |
| 2,170,975 | Pick | Aug. 29, 1939 |
| 2,191,232 | Heinen | Feb. 20, 1940 |
| 2,192,835 | Leach | Mar. 5, 1940 |
| 2,209,991 | McGill | Aug. 6, 1940 |
| 2,317,407 | Samiran | Apr. 27, 1943 |
| 2,324,932 | Johnson | July 20, 1943 |
| 2,361,655 | Robinson | Oct. 31, 1944 |
| 2,377,473 | Wolcott | June 5, 1945 |

FOREIGN PATENTS

| Number | Country | Date |
|---|---|---|
| 162,058 | Great Britain | Apr. 19, 1921 |
| 337,198 | Italy | Feb. 27, 1936 |